I

(12) United States Patent
Kroening

(10) Patent No.: US 6,859,924 B1
(45) Date of Patent: Feb. 22, 2005

(54) SYSTEM RESTORE APPARATUS AND METHOD EMPLOYING VIRTUAL RESTORE DISK

(75) Inventor: James L. Kroening, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 780 days.

(21) Appl. No.: 09/735,153

(22) Filed: Dec. 12, 2000

Related U.S. Application Data

(63) Continuation-in-part of application No. 09/630,404, filed on Aug. 2, 2000, now abandoned, which is a continuation-in-part of application No. 09/562,870, filed on May 1, 2000, now abandoned, and a continuation of application No. PCT/US99/08095, filed on Apr. 13, 1999, which is a continuation of application No. 09/090,118, filed on Jun. 4, 1998, now Pat. No. 6,080,207.
(60) Provisional application No. 60/247,452, filed on Nov. 9, 2000.

(51) Int. Cl.$^7$ .............................................. G06F 9/44
(52) U.S. Cl. ...................................... 717/173; 717/178
(58) Field of Search ................ 706/1–11; 717/168–178; 714/5; 707/200–203; 709/217, 218, 219

(56) References Cited

U.S. PATENT DOCUMENTS

| | | | | |
|---|---|---|---|---|
| 5,089,958 A | * | 2/1992 | Horton et al. ................. | 714/5 |
| 5,469,573 A | * | 11/1995 | McGill et al. ............... | 717/127 |
| 5,479,654 A | * | 12/1995 | Squibb ........................ | 707/201 |
| 5,894,571 A | | 4/1999 | O'Connor .................... | 395/652 |
| 5,963,743 A | | 10/1999 | Amberg et al. .............. | 395/712 |
| 5,991,543 A | | 11/1999 | Amberg et al. .............. | 395/712 |
| 5,995,757 A | | 11/1999 | Amberg et al. .............. | 395/712 |
| 6,151,643 A | * | 11/2000 | Cheng et al. ................. | 710/36 |
| 6,199,204 B1 | * | 3/2001 | Donohue ..................... | 717/178 |
| 6,202,207 B1 | * | 3/2001 | Donohue ..................... | 717/173 |
| 6,411,943 B1 | * | 6/2002 | Crawford ..................... | 705/400 |
| 6,519,762 B1 | * | 2/2003 | Colligan et al. ............. | 717/170 |
| 6,557,054 B2 | * | 4/2003 | Reisman ....................... | 710/33 |

\* cited by examiner

Primary Examiner—Tuan Dam
Assistant Examiner—Eric B. Kiss
(74) Attorney, Agent, or Firm—Scott Charles Richardson; Chad W. Swantz; Suiter-West

(57) ABSTRACT

A system and method employing a virtual restore disk, such as a vendor supplied CD-ROM, allows software restoration from the vendor's software library. The customer's original software configuration is archived and the customer may use the virtual restore disk for restore purposes as necessary, e.g., to restore a deleted file, replace a suspected corrupted file, etc. The vendor maintains updated versions of the software so that unlike a static restore disk, the customer is not limited to the releases available at the time of system purchase. The virtual restore disk can also be used to update a user's system, even in the absence of system malfunction.

11 Claims, 5 Drawing Sheets

SYSTEM RESTORE APPARATUS AND METHOD EMPLOYING VIRTUAL RESTORE DISK

CROSS REFERENCE TO RELATED APPLICATIONS

The present application is a Continuation-in-Part of U.S. patent application Ser. No. 09/630,404 filed Aug. 2, 2000, pending. Said U.S. patent application Ser. No. 09/630,404 is a Continuation-in-Part of U.S. patent application Ser. No. 09/562,870 filed May 1, 2000 (now abandoned), which is a Continuation of U.S. patent application Ser. No. 09/090,118 filed Jun. 4, 1998, now U.S. Pat. No. 6,080,207 issued Jun. 27, 2000.

Said U.S. patent application Ser. No. 09/630,404 is also a Continuation-In-Part of International Patent Application Serial Numbar PCT/US99/08095, international filing date Apr. 13, 1999, pending. Said U.S. patent application Ser. No. 09/630,404, said U.S. patent application Ser. No. 09/090,118, Patent Cooperation Treaty Application PCT/US99/08095 and U.S. patent application Ser. No. 09/562,870 are herein incorporated by reference in their entirety.

The present application also claims the benefit of U.S. Provisional Application No. 60/247,452, filed on Nov. 9, 2000. Said U.S. Provisional Application No. 60/247,452, filed on Nov. 9, 2000 is hereby incorporated by reference.

| Attorney Docket No. | Filing Date | Ser. No. |
| --- | --- | --- |
| GW 97-0506A | Aug. 2, 2000 | 09/631,641 |
| GW 97-0506B | Aug. 2, 2000 | 09/631,088 |
| GW 97-0506D1 | Aug. 2, 2000 | 09/631,081 |
| GW 97-0506D2 | Aug. 2, 2000 | 09/630,404 |
| GW 97-0506D4 | Aug. 2, 2000 | 09/631,085 |

FIELD OF THE INVENTION

The present invention relates generally to a system and method for restoring software components on a computer system and more particularly to an improved apparatus and method wherein the restore functionality provides access to software updates, unlike static restore disks that only allow restoration of the particular software component revisions available at the time of system purchase.

BACKGROUND OF THE INVENTION

It is a common practice of vendors of computer systems to provide a restore disk with a purchased computer system, usually a CD-ROM, which may be used to restore the hard drive of the computer system to the state it was in when the system was purchased, or to restore or replace particular originally installed software components such as drivers, application programs, and so forth. The conventional restore disks provide a variety of useful purposes. For example, a customer of a computer system may accidently delete from the hard drive a software component that is either desired by the user or necessary for proper functioning of the computer system, in which case a restore disk may be used to replace the deleted component. Or, the restore disk allows a user to intentionally delete presently unwanted preinstalled software with the ability to easily restore it in the future if desired. Also, a software component may become corrupted, and any malfunctioning caused by such corruption can be remedied by replacing the corrupted component from the restore disk. Likewise, when a malfunction occurs, having the ability to remove and replace particular software components can greatly aid in diagnosing the cause of the malfunction. For example, if a particular piece of hardware inexplicably malfunctions, one may delete or uninstall the driver associated with that piece of hardware and reinstall that driver from the system restore CD. Even if the problem is not solved, it is useful to know that the problem is not being caused by a corrupted or missing driver and other causes may then be investigated. Finally, the restore disk can be used to restore the hard drive in the event of a hard drive failure.

Presently, with the prevalence of the Internet, software upgrades and updates are now continually and readily available from a variety of sources. Upgrades and updates are desirable because they generally fix errors (bugs) and/or provide enhanced features. Before the widespread availability of the Internet, other than the retail purchase of a major upgrade, it was generally only the most adept computer users that bothered to obtain updates, which generally meant seeking out their availability, contacting the vendor for disks, or perhaps dialing into a vendor's bulletin board system and downloading.

Presently, updates are routinely made available free of charge. For example, many software vendors make updates freely available on their web pages. Many software applications contain a self-updating feature, for example, that takes advantage of Internet access and which may even be run from within the application itself. Also, there exists a number of Internet-based update services that automate the process of obtaining updates.

Thus, although restore disks can be very useful, the more a user takes advantage of available upgrades, the more reluctant a user may be to use an outdated restore disk since it may cause an updated file to be replaced with an older version of the originally installed file.

In the event of a hard disk drive catastrophe, regular full system backups are one solution to the loss of acquired updates, however, this obviates the need for a restore disk. Furthermore, many users are not inclined to do full backups since it involves a great deal of time (e.g., particularly if floppy disks or other small capacity storage media are used), and/or an additional hardware expense (e.g., tape drive, large capacity removable media, etc.). With a restore disk, a user can also protect against loss by backing up only data. In that case, the system can be restored with the system restore disk (as well as any install disks of later purchased software) and reinstalling the backed up data. However, this is primarily useful shortly after the computer is purchased, and tends to lose relevancy the longer the system is in use since any updates obtained subsequent to the computer purchase will be lost. Although the Internet makes individual updates readily obtainable, when considering many updates accumulated gradually over time, the loss can be significant.

Therefore, it would be desirable to provide a system restore apparatus and method which improves upon the conventional restore disks by remaining up to date throughout the life of the computer.

SUMMARY OF THE INVENTION

The present invention provides systems and methods for restoring software installed on a customer computer system comprising providing a computer readable medium, such as a CD-ROM, comprising communication software configured to provide a communication connection with a vendor computer system wherein the customer computer system and the vendor computer system are located remotely of each other. The vendor computer system comprises a software library including the software components installed on the customer computer system as well as any updated versions of such software components. The vendor computer system is configured to transfer software components via the connection as an alternative to a conventional static restore CD containing potentially outdated files. The software allows a user to select one or more software components to restore, e.g., from a list of installed software components contained on the computer readable medium, and to initiate a connection between the customer computer system and the vendor computer system. The selected software components are identified to the vendor computer system which then transfers the selected software components for installation on the customer computer system.

In a further aspect, the computer readable medium may further comprise a copy of the installed software. In such embodiments, it may be determined whether a later version or revision of the selected software components exists in the vendor's software library. If there is an updated version of any of the selected software components in the software library, that version is transferred over the connection for installation. If there are selected software components for which there does not exist an updated version in the software library, such components may be installed directly from the computer readable medium.

It is to be understood that both the foregoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
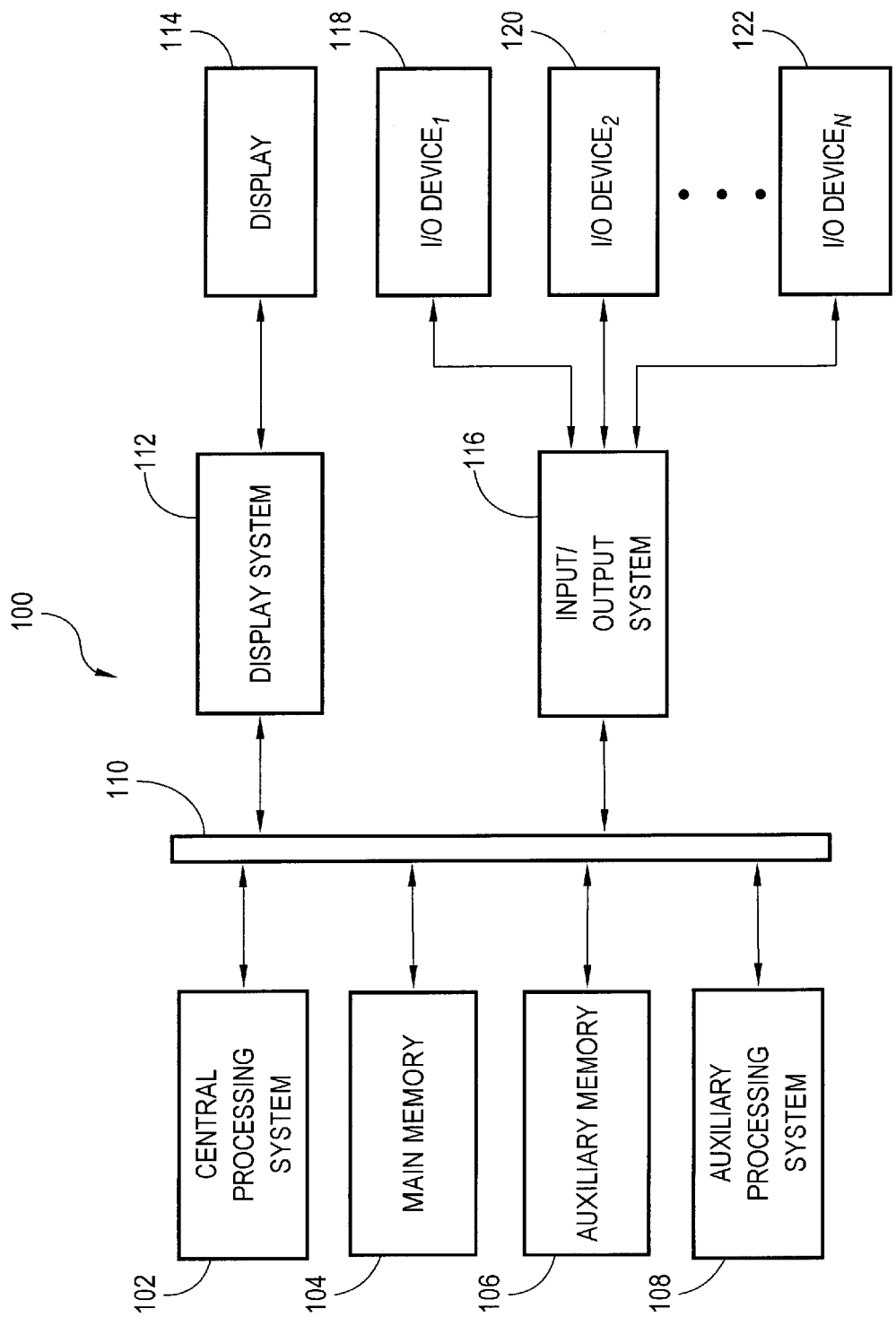
FIG. 1 is a block diagram of an exemplary computer system operable to embody the present invention.

Referring now to FIG. 1, an information handling system operable to embody the present invention is shown. The hardware system 100 shown in FIG. 1 is generally representative of the hardware architecture of a computer-based information handling system of the present invention. The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 110 for transferring information among the components of the hardware system 100. The bus 110 may include a data channel for facilitating information transfer between storage and other peripheral components of the hardware system. The bus 110 further provides the set of signals required for communication with the central processing system 102 including a data bus, address bus, and control bus. The bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, and auxiliary memory 106. The hardware system 100 may further include an auxiliary processing system 108 as required. The main memory 104 provides storage of instructions and data for programs executing on the central processing system 102. The main memory 104 is typically semiconductor-based memory such as dynamic random access memory (DRAM) and/or static random access memory (SRAM). Other semi-conductor-based memory types include, for example, synchronous dynamic random access memory (SDPRAM), Rambus dynamic random access memory (RDRAM), ferroelectric random access memory (FRAM), and so on. The auxiliary memory 106 provides storage of instructions and data that are loaded into the main memory 104 before execution. The auxiliary memory 106 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 106 may also include a variety of nonsemiconductor-based memories, including, but not limited to, magnetic tape, drum, floppy disk, hard disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 100 may optionally include an auxiliary processing system 108 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 100 further includes a display system 112 for connecting to a display device 114, and an input/output (I/O) system 116 for connecting to one or more I/O devices 118, 120, up to N number of I/O devices 122. The display system 112 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 114 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth.

The input/output system 116 may comprise one or more controllers or adapters for providing interface functions between the one or more I/O devices 118–122. For example, the input/output system 116 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 116 and I/O devices 118–122 may provide or receive analog or digital signals for communication between the hardware system 100 of the present invention and external devices, networks, or information sources. The input/output system 116 and I/O devices 118–122 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
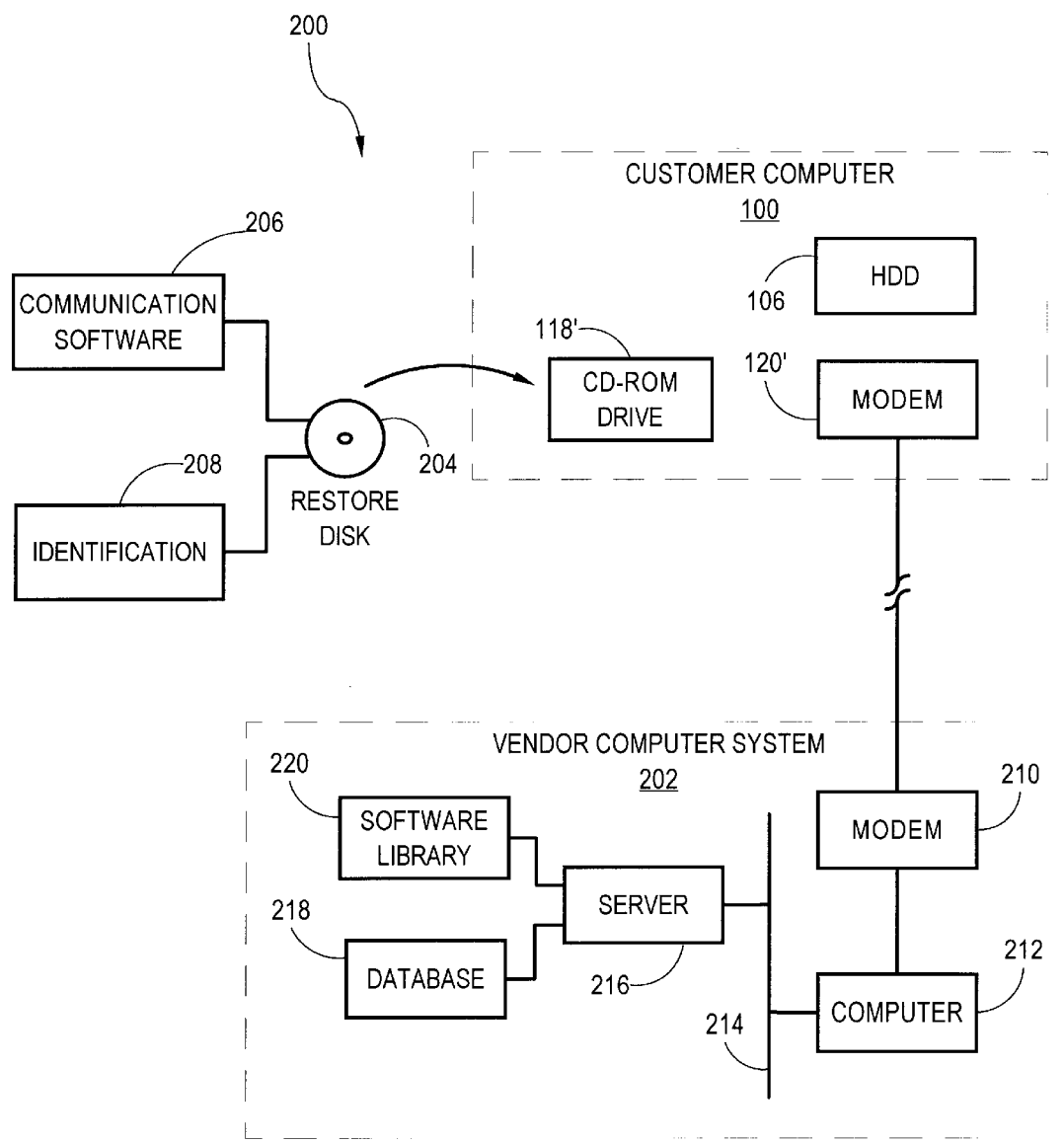
FIG. 2 is a block diagram illustrating an exemplary restore system in accordance with the present invention.

Referring now to FIG. 2, there is shown a restore system 200 in accordance with the present invention. As shown, the restore system 200 includes a customer computer system 100 located at a first site and a vendor computer system 202 located at a second site remotely located from the first site. The restore system 200 will be discussed herein primarily in terms of an improvement over conventional system restore disks provided by computer system vendors for restoring software components which were preinstalled on hard disk drive 106 of customer 100 when purchased or leased from the vendor, it will be recognized that computer system 202 may be that of a third party other than the vendor of the computer system, for example, a system restore service provider, e.g., operating on behalf of the computer system vendor.

Although the present invention will be described herein primarily by way of reference to restoration of preinstalled software components, it will be recognized that since the restore system is not static, it may also be adapted to include software components acquired after purchase of the computer system contained in vendor software library 220. For example, the customer may be required to demonstrate proof of ownership of a valid license, in which case database 218 may be updated to allow access to such newly purchased software for restoration in accordance with this teaching.

The terms "update" and "upgrade" are used interchangeably herein without attention to any nuances in their meanings, and the terms are intended to encompass any later version, revision, or release of a software component, for example, of the type typically released to provide bug fixes, enhanced features, and so forth. Many updates or upgrades are provided free of charge, although the present invention is also intended to also encompass updates or upgrades that require purchase or payment of a licensing fee to the software vendor. In the case of an update requiring payment of a fee, the payment may be made electronically or otherwise.

The term "restore" is intended to encompass replacement of a software component that is missing from a hard disk drive of the computer system as well as overwriting an software component that is present. When a software component that is present is restored (overwritten), the overwritten software component may or may not be malfunctioning or corrupted.

When purchased, computer system 100 is provided with restore disk 204 in accordance with this teaching. Disk 204 may be provided in addition to or as an alternative to a conventional system restore disk. Disk 204, for use in CD-ROM drive 118', comprises communication software 206 enabling data communication between customer computer system 100 and vendor computer system 202. Although the embodiment of FIG. 2 depicts a CD-ROM and CD-ROM drive, it will be recognized that other drive and media types may likewise be employed. For example, drive 118' may be a DVD, CD-R, CD-RW, removable hard drive, or other removable magnetic media drive, and restore disk 204 the corresponding compatible media type. The communication software 206 may comprise, for example, browser or other software allowing access to the vendor computer system 202 via an Internet connection, or may be communication software for providing a direct dial-up connection between the customer computer system 100 and the vendor computer system 202.

In a preferred embodiment, the restore disk 204 further comprises the necessary operating system software to boot customer computer system 100, allowing the communication software 206 to run on customer computer system 100 without booting from hard disk drive 106. In other embodiments, e.g., where drive 118' is not a bootable drive, computer system 100 may be booted from another start up disk, such as a floppy boot disk, prior to running communication software 206. Of course, if hard disk drive 106 is operable, it may also be possible to boot the customer computer system 100 from the hard disk drive 106 for the purpose of running communication software 206 and executing the restore method of the present invention, however, it will be recognized that certain software components may not be able to be installed using the restore method in accordance with this teaching, e.g., software components that are in use.

Restore disk 204 may also contain optional identification data 208. Identification data 208 may comprise, for example, a list of software components, including revision information, preinstalled on hard drive 106. Alternatively, identification data 208 may simply comprise an identifier which may be used to access the list of software components associated with that identifier and stored elsewhere, for example, in database 218 on vendor computer system 202. The identifying information may be, for example, an indication of when the restore disk was made, such as a date or a revision or version number of the restore disk. In the case of a build-to-order computer system wherein the customer selects a custom software configuration and wherein a custom restore disk is likewise created for the system, the identification data 208 may be customer information such as customer name or a unique textual, numeric, or alphanumeric identifier, such as a vendor assigned customer number or account number, serial number of the computer system, serial number of another component such as the CPU, or other similar identifier.

As stated above, identification data 208 is optional and it will be recognized that other identification means can be used identification data on the restore disk 204. For example, a user may be assigned an identifier, such as a user name and/or password, required to access vendor computer system 202. Or, the identification may be locally stored on the customer computer system 100, e.g., a serial number or other identification number of some hardware component of the computer system 100, such as a serial number or identification number assigned to and stored in the CPU, may be used as the identifier. The use of a hardware identifier, such as a serial number of the CPU, may be in addition to or in lieu of identification data on the restore disk 204, and serves a further advantage of preventing unauthorized downloading of software from software library 212 by limiting use of the restore disk 204 to a particular computer or a particular group of computers, such as similarly configured models or series.

Customer computer system 100 is shown with first modem 120' for connecting customer computer system 100 to second modem 210 of the vendor computer system 202, thus allowing the transfer of information between customer computer system 100 and the vendor computer system 202. As shown, the vendor computer system 202 is depicted as a local area network (LAN) comprising computer 212 connected to modem 210 which, in turn, is connected to file server 216 via network connection 214. The file server 216 has a database 218 from which information can be retrieved by computer 212 via the file server 216 and a software library 220 containing the software components of all systems manufactured by the vendor. The configuration of network 202 is exemplary only and it will be recognized that other network configurations may be used, or, that vendor computer system 202 need not comprise a network. Likewise, although customer computer system 100 is depicted as a stand alone computer system, it will be recognized that customer computer system may be on a network having shared access to modem 120' over the network. It will also be recognized that modems 120' and 210 are not limited to conventional modems employing telephone lines, but may also be cable modems employing coaxial cable television network lines, or a high speed connection such as an ISDN line interface, T-carrier line interface, and so forth.

When the customer of the computer system 100 desires to restore some initially installed component, communication software 206 is run and a connection between customer computer system 100 and vendor computer system 202 is initiated. The customer computer system 100 then executes programming to identify to the vendor computer system 202 the software components to be downloaded from vendor computer system 202 to be restored on customer computer system 100. In one embodiment, identification data 208 contains a list of all preinstalled software components and user may select the particular components to restore via an input device such as a keyboard or pointing device. Less savvy computer users may not be able to identify by filename particular components to replace. Thus, as yet a further additional or alternative input method, the user input may be obtained through a series of interactive prompts, such as a software "wizard" or the like to guide a user through the process of selecting files to restore wherein a series of questions are asked and wherein the answers to the questions dictate the subsequent questions. For example, such a questionnaire or wizard interface might begin by asking whether there is any malfunctioning of customer computer system 100. If so, further questions about the nature of the malfunction may be asked to determine the necessary files to transfer, which may range from a replacement of a single file such as the driver of a malfunctioning hardware device or an accidently deleted file to a complete system restore, e.g., in the event of catastrophic hard disk drive failure. On the other hand, if the user indicates that the system is currently not malfunctioning, the user interface could then inform the user of components that have updated versions available, which may then be downloaded. As yet a further additional or alternative method of selecting components to download, one or more files, such as an error log, configuration files, etc., of computer 100 may automatically be transferred to vendor computer system 202 for evaluation to determine which software components need to be restored or replaced.

In certain embodiments wherein the restore disk 204 does not contain a list of preinstalled software, some identifying data as detailed above, such as identification data 208, a hardware identifier, or a user name and/or password is input and the list of preinstalled software may be obtained from database 218 and transferred to computer system 100. The selection of software components for restoring may then proceed as described above, e.g., by selection from an on-screen list or menu or via a software wizard-type interface.

In certain embodiments, the restore disk 204 may further comprise a backup copy of the preinstalled software components of customer computer system 100, in which case the restore disk may additionally be utilized in the same manner as a conventional restore disk, for example, if a communication connection between customer computer system 100 and vendor computer system 202 cannot be established. In preferred embodiments, particularly where a high speed connection is not available, the communication connection between the customer computer system 100 and the vendor computer system 202 is employed for transferring software components to be restored which have updated versions available in software library 220 and any software components to be restored which do not have an updated version available in software 220 are installed from restore disk 204.

In the event that a restored file is an update of the originally installed software component, database 218 is preferably updated to reflect the latest version obtained by the customer computer system 100.

Figure 3:
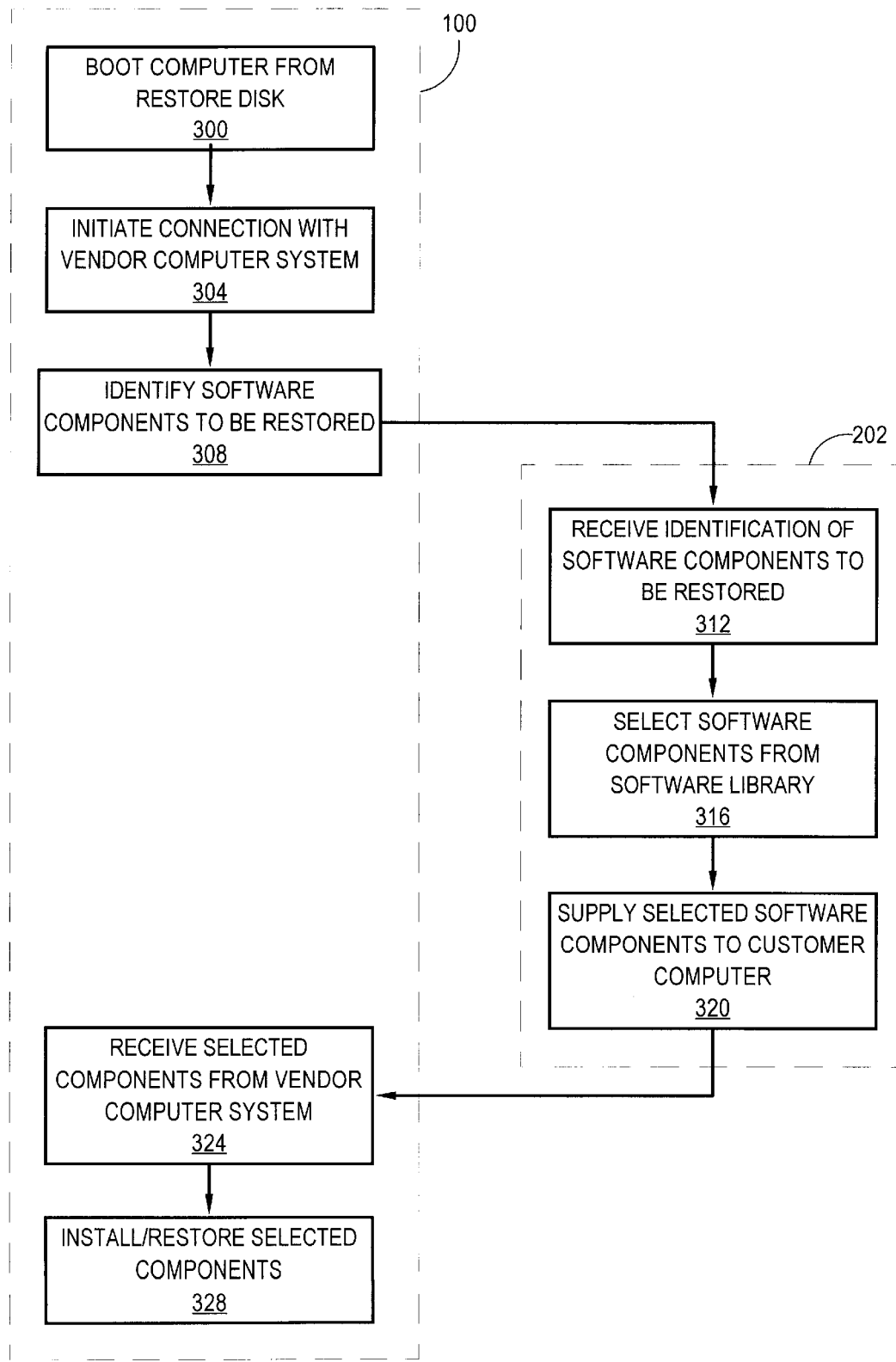
FIGS. 3–5 are flow charts illustrating exemplary restore methods in accordance with the present invention.

Referring now to FIG. 3, there is shown a flowchart illustrating a method in accordance with the present invention. The method may be executed by restore system 200 (FIG. 2) of the present invention. As shown in FIG. 3, programming associated with steps 300, 304, 308, 324, and 328 is executed by customer computer 100, and programming associated with steps 312, 316, and 320 is executed by vendor computer system 202. In step 300, customer computer system 100 is booted up using restore disk 204 (FIG. 2). In alternative embodiments a boot disk other than restore disk 204 may be used, e.g., where drive 118' is not a bootable drive. In step 304, communication software 206 (FIG. 2) on disk 204 is run to establish a connection over which information may be communicated between customer computer system 100 and vendor computer system 202. In step 308, customer computer system 100 identifies in a manner described above one or more software components to be restored from software library 220 (FIG. 2) stored on vendor computer system 202.

In step 312, vendor computer system 202 receives the identity of software components to be restored and in step 316 selects the identified components from software library 220. The selected software components are then transferred to customer computer system 100 in step 320.

In step 324, the customer computer system 100 receives the selected software components from the vendor computer system 202 via the communication connection and in step 328 the selected components are installed on hard disk drive 106 (FIG. 2) of customer computer system 100.

Figure 4:
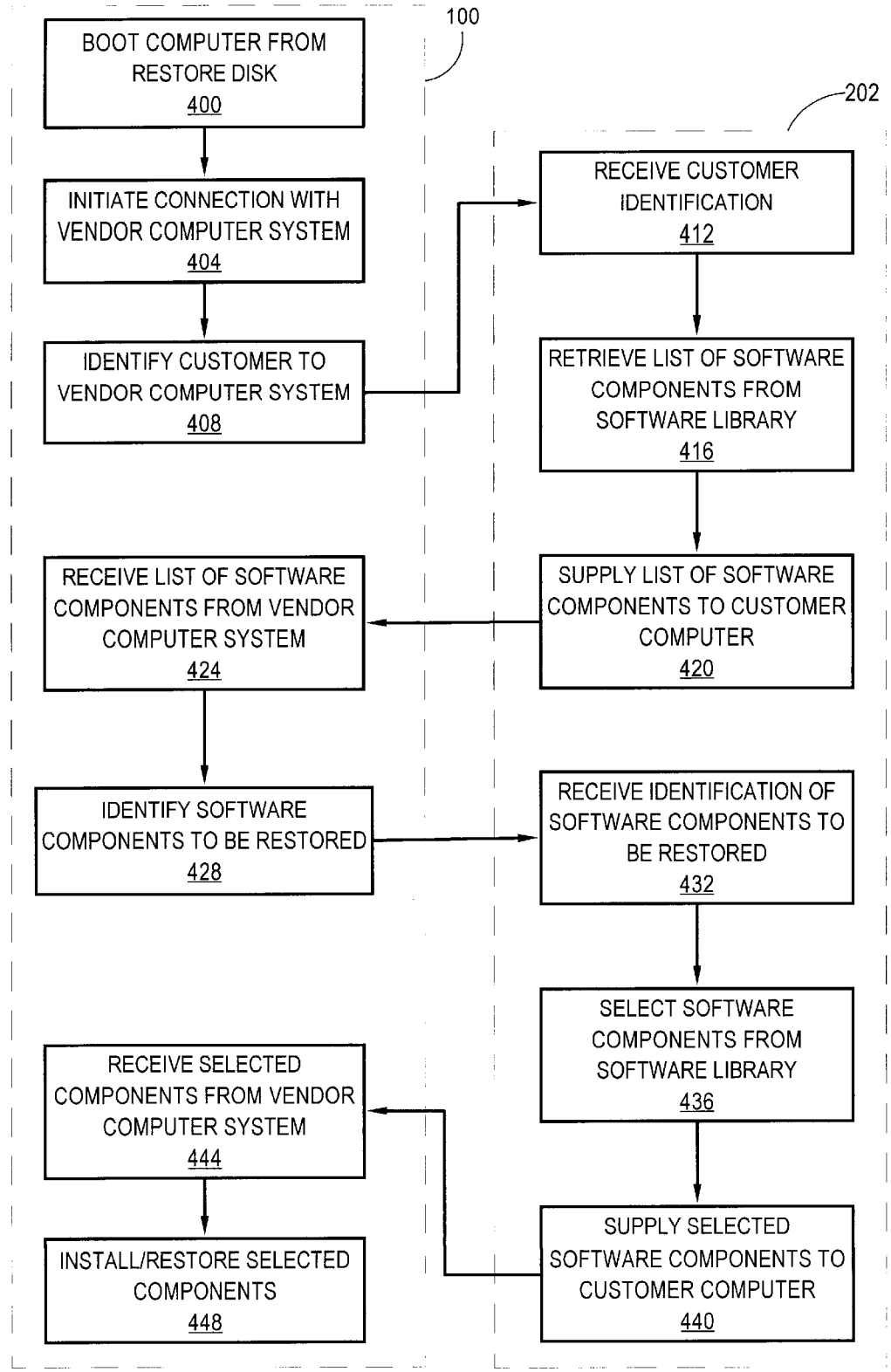

Referring now to FIG. 4, there is shown a flowchart illustrating a method in accordance with another embodiment of the present invention. The method may be executed by restore system 200 (FIG. 2) of the present invention. As shown in FIG. 4, programming associated with steps 400, 404, 408, 424, 428, 444, and 448 is executed by customer computer system 100, and programming associated with steps 412, 416, 420, 432, 436, and 440 is executed by vendor computer system 202. In step 400, customer computer system 100 is booted up using restore disk 204 (FIG. 2). Again, in alternative embodiments a boot disk other than restore disk 204 may be used, e.g., where drive 118' is not a bootable drive. In step 404, communication software 206 (FIG. 2) on disk 204 is run to establish a connection over which information may be communicated between customer computer system 100 and vendor computer system 202. In step 408, the customer and/or customer computer system 100 is identified to the vendor computer system 100 as detailed above.

In step 412, the vendor computer system 412 receives the identification and can retrieve a list of software preinstalled on customer computer system 100, e.g., which may be archived in database 218 (FIG. 2) or other local storage. The list of software components is supplied to customer computer system 100 in step 420.

In step 424, the list of software components is received by customer computer system 100 and in step 428, the software components to be restored are selected and identified in a manner described above.

In step 432, vendor computer system 202 receives the identity of software components to be restored and in step 436 selects the identified components from software library 220 (FIG. 2). The selected software components are then transferred to customer computer system 100 in step 440.

In step 444, the customer computer system 100 receives the selected software components from the vendor computer system 202 via the communication connection and in step 448 the selected components are installed on hard disk drive 106 (FIG. 2) of customer computer system 100.

Figure 5:
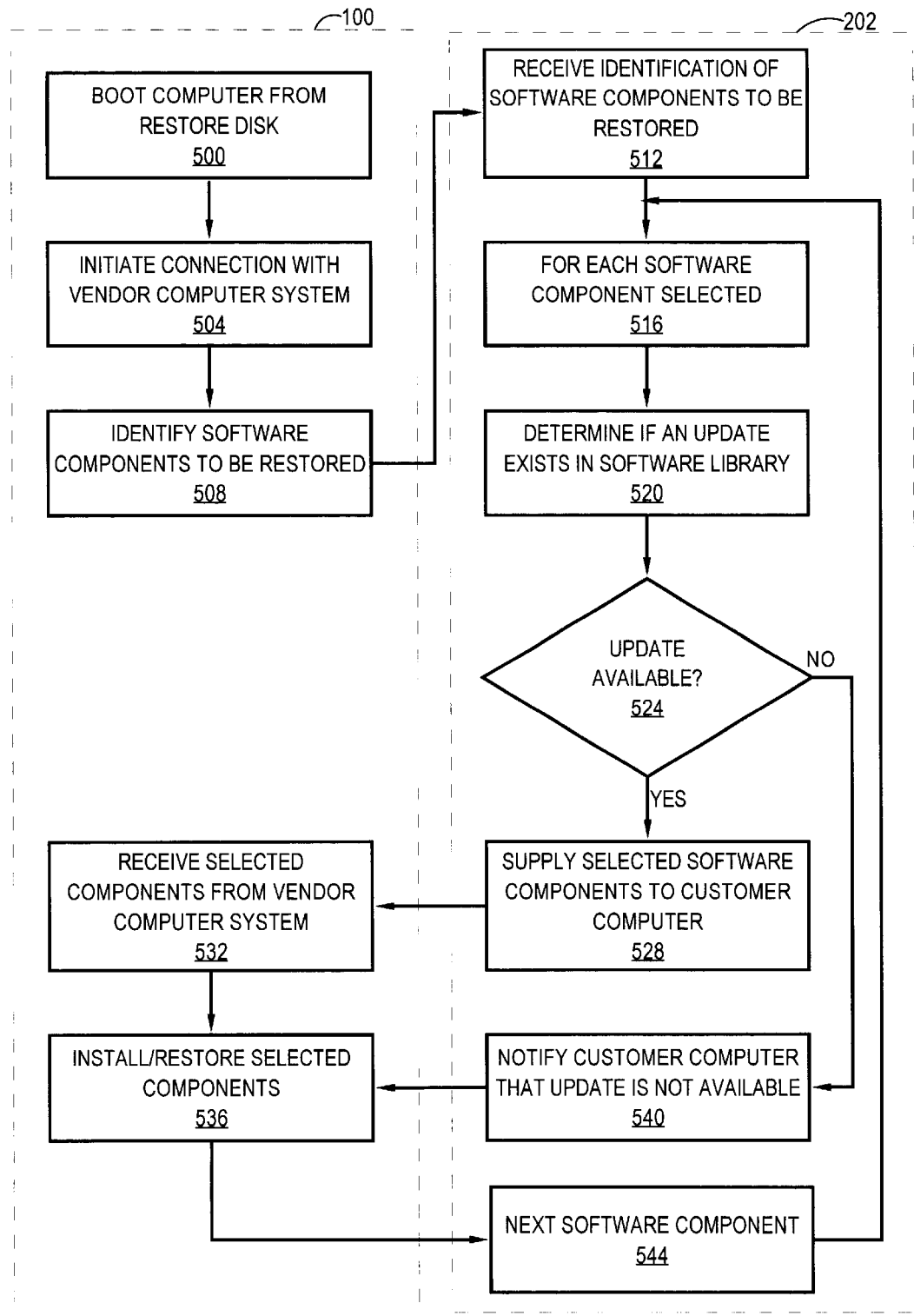

Referring now to FIG. 5, there is shown a flowchart illustrating a method in accordance with another embodiment of the present invention. The method may be executed by restore system 200 (FIG. 2) of the present invention. As shown in FIG. 5, programming associated with steps 500, 504, 508, 532, and 536 is executed by customer computer system 100, and programming associated with steps 512, 516, 520, 524, 528, 540, and 544 is executed by vendor computer system 202. In step 500, customer computer system 100 is booted up using restore disk 204 (FIG. 2). Again, in alternative embodiments a boot disk other than restore disk 204 may be used, e.g., where drive 118' is not a bootable drive. In step 504, communication software 206 (FIG. 2) on disk 204 is run to establish a connection over which information may be communicated between customer computer system 100 and vendor computer system 202. In step 308, customer computer system 100 identifies in a manner described above one or more software components to be restored from software library 220 (FIG. 2) stored on vendor computer system 202.

In step 512, vendor computer system 202 receives the identity of software components to be restored and in steps 516–544 are repeated for each software components selected to be restored. In step 520, the selected software components are selected from software library 220 and a comparison is made to determine whether an update for the selected component exists in software library 220. The determination of whether an update exists for each software component to be restored can be performed in a number of ways. For example, the database 218 (FIG. 2) may contain an archive of the software components and the particular revision numbers or revision dates thereof for each customer. Alternatively, this information may be communicated from customer computer system 100, e.g., from restore disk 204 (for example, as a part if identifying information 208 (FIG. 2)) or other local storage.

If an update is available in software library 220 for a given selected software component in step 524, the update of the selected software components are then transferred to customer computer system 100 in step 528. The process then proceeds to step 536 and the update is installed on customer computer system 100 and the process proceeds to step 544.

If an update is not available in software library 220 for a given selected software component in step 524, the customer computer system 100 is notified in step 540 that an update is not available and the process continues to step 536 and the customer is given the option of installing the selected software component onto customer computer system 100 directly from restore disk 204, the transfer of which will generally be faster than via a remote connection such as a dial up connection or connection via the Internet. The process then proceeds to step 544.

In step 544, the process returns to step 516 and repeats until all of the selected software components have been restored.

Thus, it can be seen that the present invention improves upon the conventional restore disks which tend to become obsolete in light of widely available software updates. For the customer who regularly updates his or her computer system, using the restore disk in accordance with this teaching does not mean loss of updated components and the system and method according to the present invention find additional utility as a convenient means for obtaining updates.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. For example, sine the restore disk of the present invention is not static, it need not be limited to restoration of preinstalled software. For example, the scope of restore coverage may be expanded to cover software obtained after the computer system was purchased, e.g., when a customer shows proof of purchase or valid license. The system may also be to identify a customer's software needs based on currently owned software, e.g., to identify or market to the customer other software that may enhance existing software or that may otherwise be useful or desirable to the customer. Also, when a software component in software library 220 is updated, all customers using that file may be notified by the vendor of the availability of the update, which may be obtained by the customer using restore disk 204. Likewise, the system may be used to offer to customers custom updated restore disks or custom supplemental restore disks. Accordingly, the scope of the invention should be determined solely by the appended claims and their legal equivalents.

What is claimed is:

1. A method of restoring software installed on a customer computer system, comprising:
   (a) providing a computer readable medium for use with said customer computer system, said computer readable medium comprising:
      communication software configured to provide a communication connection with a vendor computer system, said customer computer system and said vendor computer system being located remotely of each other, said vendor computer system components installed on said customer computer system and any updated versions of said software components, wherein said vendor computer system is configured to transfer software components via said connection; and
      a copy of the software components installed on said customer computer system;
   (b) receiving of a selection of one or more software components to restore by said customer computer system;
   (c) initiating a connection by said customer computer system to said vendor computer system;
   (d) identifying to the vendor computer system said selected software components;
   (e) comparing, by said vendor computer system, each of the selected software components to be restored with said software library and determining for which of said selected software components there exists an updated version in said software library and for which of said selected software components there does not exist an updated version in said software library;
   (f) if there are selected software components for which there exists an updated version in the software library, transferring and installing said updated versions from the vendor computer system to said customer computer system; and
   (g) if there are selected software components for which there does not exist an updated version in the software library, transferring and installing said selected software components for which there does not exist an updated version in the software library from said computer readable medium.

2. A method according to claim 1, wherein computer readable medium comprises a list of software components said installed on said customer computer system and wherein said software components to restore are selected from said list.

3. A method according to claim 1, wherein vendor computer system comprises a list of software components said installed on said customer computer system and wherein said software components to restore are selected from said list.

4. A method according to claim 1, further comprising the step of transferring over said connection information for identifying a particular customer or a particular computer system prior to said vendor computer system supplying said selected components.

5. A method according to claim 4, wherein said vendor computer system comprises a database, said database comprising a list of software components associated with said information identifying a particular customer or a particular computer system.

6. A method according to claim 4, wherein said information for identifying a particular customer or a particular computer system is input by a user.

7. A method according to claim 4, wherein said information for identifying a particular customer or a particular computer system is stored on said customer computer system.

8. A software restore system for restoring software components installed on a customer computer system, comprising:
   (a) said customer computer system;
   (b) a vendor computer system located remotely of said customer computer system, said vendor computer system configured to allow communication with said customer computer system;
   (c) a computer readable medium for use with said customer computer system, said computer readable medium comprising:
      communication software configured to provide communication with said vendor computer system, said customer computer system and said vendor computer system being located remotely of each other, said vendor computer system comprising a software library, said software library including the software components installed on said customer computer system and any updated versions of said software components;
      a copy of the software components installed on said customer computer system; and
      software configured to identify to the vendor computer system said selected software components to be restored;

(d) wherein said vendor computer system is configured to:
  compare each of the selected software components to be restored and with said software library and determine for which of said selected software components there exists an updated version in said software library and for which of said selected software components there does not exist an updated version in said software library;
  if there are selected software components for which there exists an updated version in the software library, to supply the selected software components via said connection to said customer computer; and
(f) wherein said customer computer system is configured to receive said updated versions from said vendor computer and, if there are selected software components for which there does not exist an updated version in the software library, to transfer and install onto said customer computer system said selected software components for which there does not exist an updated version in the software library from said computer readable medium.

9. A system according to claim 8, wherein computer readable medium comprises a list of software components installed on said customer computer system.

10. A system according to claim 8, wherein said vendor computer system comprises a list of software components installed on said customer computer system.

11. A system according to claim 8, wherein said customer computer system is configured to identify a particular customer or a particular computer system.

* * * * *